United States Patent [19]

Adam et al.

[11] Patent Number: 5,686,176

[45] Date of Patent: Nov. 11, 1997

[54] PLAIN BEARING MATERIAL COMPRISING PTFE AND CHALK AND COMPOSITE MULTI-LAYER MATERIAL

[75] Inventors: Achim Adam, Nauheim; Jürgen Deinert, Münster, both of Germany

[73] Assignee: Glyco-Metall-Werke Glyco B.V. & Co. KG, Wiesbaden, Germany

[21] Appl. No.: 519,498

[22] Filed: Aug. 25, 1995

[30]  Foreign Application Priority Data

Aug. 27, 1994 [DE] Germany ............................ 44 30 474.9

[51] Int. Cl.⁶ ...................................................... B32B 5/16
[52] U.S. Cl. .................. 428/327; 428/328; 428/330; 428/333; 428/340; 428/421; 428/423.5; 428/908.8
[58] Field of Search ............................ 428/327, 330, 428/328, 333, 340, 421, 423.5, 108.8

[56]  References Cited

U.S. PATENT DOCUMENTS

| | | | |
|---|---|---|---|
| 4,115,283 | 9/1978 | Needham | 252/12.4 |
| 4,623,590 | 11/1986 | Hodes et al. | 428/408 |
| 5,039,575 | 8/1991 | Mori et al. | 428/463 |
| 5,112,901 | 5/1992 | Buchert et al. | 524/494 |
| 5,216,079 | 6/1993 | Crosby et al. | 525/146 |

*Primary Examiner*—H. Thi Le
*Attorney, Agent, or Firm*—Lawrence J. Shurupoff

[57]  ABSTRACT

A plain bearing material includes a matrix of thermoplastic polymer which contains as inclusions additives improving antifriction properties. In the matrix are contained as additives PTFE and chalk, both PTFE and chalk being in the form of a powder. A composite multilayer material with such a plain bearing material includes a metallic backing on which a rough base is sintered or sprayed on. On this rough base is deposited the bearing metal material with a matrix material in which are included the additives.

12 Claims, 3 Drawing Sheets

PLAIN BEARING MATERIAL COMPRISING PTFE AND CHALK AND COMPOSITE MULTI-LAYER MATERIAL

BACKGROUND OF THE INVENTION

1. Field of the Invention

The invention relates to a plain bearing material comprising a matrix of thermoplastic polymer which contains as inclusions additives improving antifriction properties. The invention relates also to a composite multi-layer material in which is used such plain bearing material.

2. Description of Prior Developments

From DE-AS 1 569 243 is known a bearing which requires no lubrication and which is composed of polytetrafluoroethylene fibers and polyoxymethylene, wherein the polytetrafluoroethylene fibers have a length of up to 1.6 mm and are added in an amount of 5 to 40% by wt. In addition to the polytetrafluoroethylene fibers also other fibers or fillers may be added as long as they do not reduce unreasonably the friction-lowering properties of the polytetrafluoroethylene fibers.

From DE-PS 1 544 921 is known a molding material of 70 to 99.5% by wt of a polyacetal and 0.5 to 30% by wt of chalk which is used for the production of plain bearings which require no maintenance. Polyacetal is a term denoting homopolymers of formaldehyde or trioxan. The chalk added to the polyacetal is presumably independent of particle size, origin (deposit) and processing or method of production. These known plain bearings have the disadvantage that during dry running the coefficients of friction are too high and the abrasion resistance is too low.

The aim of the invention is to provide a temperature-resistant plain bearing material and a composite material with such a plain bearing material which has better dry-running properties than the known plain bearing materials and has good running qualities under hydrodynamic lubrication. During dry running particularly, the coefficients of friction should be reduced and the abrasion resistance and also load-carrying capacity should be increased.

SUMMARY OF THE INVENTION

The aims noted above are achieved by a plain bearing material in which PTFE and chalk are contained in the matrix as additives.

It was surprisingly found that the combination of chalk and PTFE results in a significant increase of the resistance to wear and the load carrying capacity, which cannot be achieved by the provision of only one of the two components, PTFE or chalk, in a plastics matrix.

According to a first embodiment the matrix material may be of PTFE so that no distinction will be made between PTFE matrix material and PTFE additive. In this embodiment the proportions of the PTFE are 50 to 95% by wt and the proportions of chalk are 5 to 50% by wt.

The second embodiment provides matrix material of another thermoplastic, which may be, for instance, PE (polyethylene), PA (polyamide), POM (polyoxymethylene), PVDF (Polyvinylidenedifluoride), PBT (polybutylene-terephthalate), PFA (perfluoro-alkoxyalkane), FEP (fluorinated ethylene propylene), PPA (polypropylene-adipate), LCP (liquid crystallyne polymers) or PEEK (polyetheretherketone).

In these cases PTFE is added only as an additive in smaller proportions which are about 10 to 60% by wt. The proportion of chalk is then preferably about 5 to 20% by wt.

It was found to be advantageous when the PTFE and/or the chalk is provided in the form of a powder. The PTFE is in the form of powder whose particle size is preferably $\leq 10$ μm and whose specific surface area is greater than or equal to 5 $m^2$ per gram. The chalk has preferably a particle size $\leq 20$ μm with a specific surface greater than or equal to 3 $m^2$ per gram.

By using chalk in the form of powder with particle sizes $\leq 10$ μm an excellent degree of homogenization may be achieved. The specific surface of the additives, which is associated with the particle size, results in an improved bonding in the thermoplastic matrix.

The action of the particles of PTFE and chalk is obviously cumulative so that, particularly during a dry run, the positive properties of these additives are increased.

The chalk is added preferably in the crystal modification of calcite or aragonite.

Calcium fluoride, molybdenum disulphide, graphite, lead, lead oxide, bronze powder and/or fibers of different length, shape and chemical composition may be used in the plain bearing multi-layer material.

From the plain bearing material may be produced plain bearings made entirely of plastics or composite multi-layer materials, which may be loaded thermally and mechanically to a much higher degree than materials for plain bearings made entirely of plastics.

As a semifinished product for the production of material for plain bearings made entirely of plastics can be used extruded parts in the form of tubes, from which are then made the bearings. Alternatively granulate may be extruded to produce anti-friction elements by injection molding of plastics.

In composite multi-layer materials the plain bearing material may be deposited, according to one embodiment, directly on a mechanically roughened or chemically pre-treated surface of a metallic backing.

According to another embodiment the plain bearing material may be deposited on a rough base sintered or sprayed on a metallic backing. The thickness of the plain bearing material is 50 μm to 1 mm, preferably 80 to 300 μm.

For the manufacture of the composite multi-layer material the extruded polymer melts may be in the form of a film (extrusion coating) or strand (calendering) which is finally deposited on a strip-shaped carrier. Alternatively, the melt film may be solidified also as a foil. This foil is then in a second method step deposited onto the backing material (lamination).

BRIEF DESCRIPTION OF THE DRAWINGS

Embodiments of the invention will now be explained in greater detail, by way of example, with reference to the drawings, in which.

DETAILED DESCRIPTION OF THE PREFERRED EMBODIMENTS

EXAMPLE 1

Figure 1:
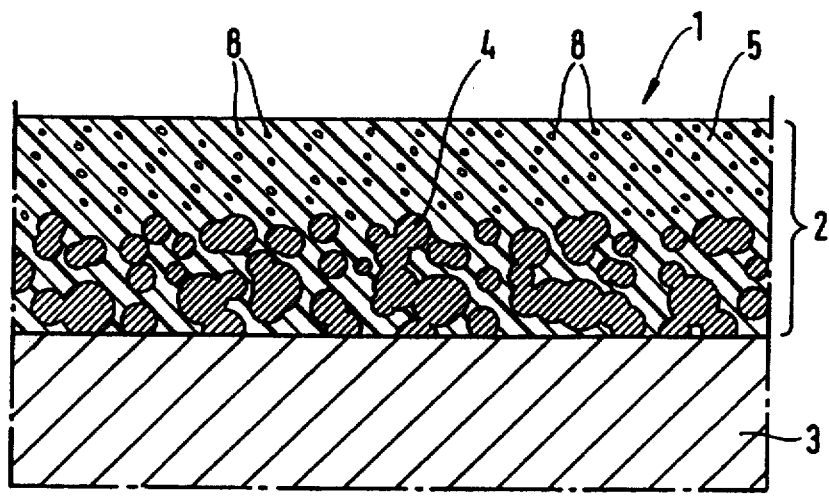
FIG. 1 is an enlarged section through a composite multi-layer material according to one embodiment.

A steel strip 3 is provided with a porous bronze structure 4 sintered thereon into which is deposited an overlay 2 consisting of 60% by wt of PTFE and
40% by wt of chalk as a paste, which is then tempered and rolled on. In this embodiment the matrix 5 is of PTFE in which are included the chalk particles 8 as an additive.

In FIG. 1 is shown in section such a composite multilayer material 1 having a steel strip 3 and overlay 2.

EXAMPLE 2

A steel strip 3 is provided with a porous bronze structure 4 sintered thereon into which is pressed the overlay 2 consisting of 60% by wt of POM
25% by wt of PTFE and
15% by wt of chalk.

The material of the overlay was melted, homogenized and compressed in an extruder and deposited as a film of melt on the metal backing 3 (extrusion coating).

Figure 2:
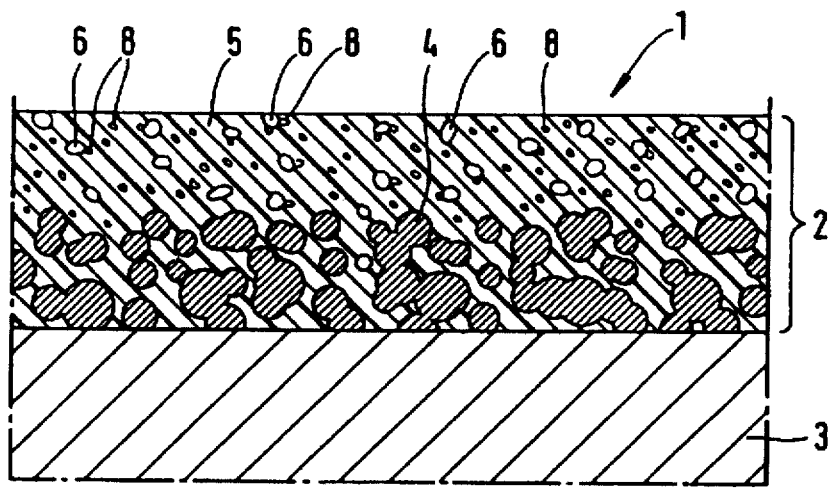
FIG. 2 is an enlarged section through a composite multi-layer material according to another embodiment.

In FIG. 2 is shown a section through such a composite multi-layer material 1. In the matrix 5 of POM are shown the PTFE/chalk particles 6/8 which are disposed partly in contact with each other and homogenously distributed in the matrix 5.

EXAMPLE 3

A mixture of

Figure 3:
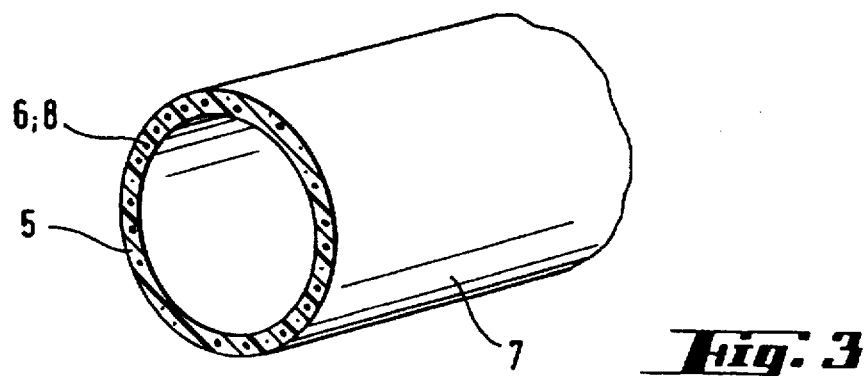
FIG. 3 is a perspective representation of a tube of plain bearing material.

60% by wt of POM
25% by wt of PTFE and
15% by wt of chalk is compressed, plasticized and homogenized in an extruder and extruded through a corresponding extrusion die as a tube 7 (see FIG. 3) whereupon it is calibrated. The tube 7 produced in this way from the plain bearing material serves as a semifinished product for the manufacture of plain bearings. Sections for slide bars etc may be similary produced.

EXAMPLE 4

A mechanically roughened steel strip is coated with an overlay consisting of

80% by wt of PE
10% by wt of PTFE and
10% by wt of chalk.

The coating of the metallic backing with a thermoplastic overlay is also made by the extrusion coating method.

EXAMPLE 5

A steel strip is provided with a porous bronze structure sintered thereon into which is pressed the overlay consisting of 70% by wt of PA
20% by wt of PTFE and
10% by wt of chalk.

Figure 4:
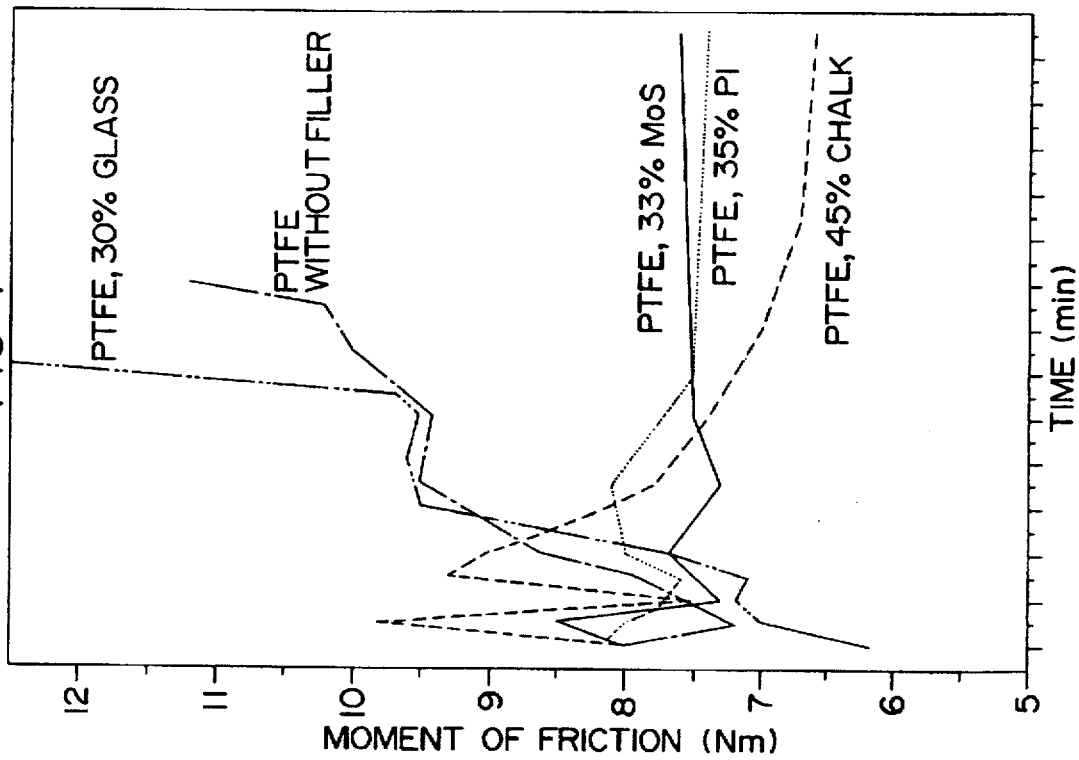
FIG. 4 is a friction factor diagram for materials having a PTFE matrix.

In FIG. 4 is shown a friction factor diagram for materials having a PTFE matrix. The tests were carried out on a pin-roll test bench with the following parameters: P=8.9 MPa, v=0.5 m/s, t=90 min in dry state. The friction factors of the PTFE materials without fillers and of the PTFE materials filled with 30% of glass noticeably increase with increasing duration of the tests. The materials comprising 33% of MOS or 35% of PI show no increase of the friction factors but are still noticeably above the material according to the invention having a PTFE matrix and 45% by wt of chalk as an additive.

Figure 5:
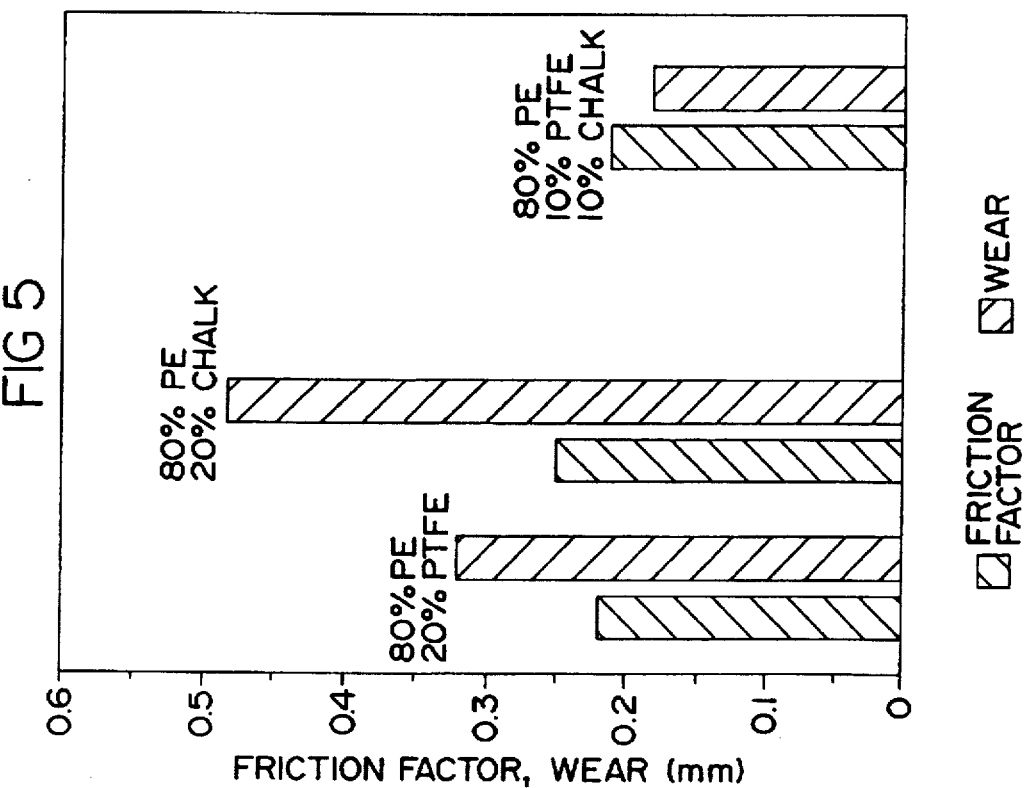
FIG. 5 is a friction factor/wear diagram for materials having a PE matrix.

In FIG. 5 are shown bar charts for materials having a PE matrix. It can be clearly seen that materials which contain either only PTFE or only chalk do not achieve the friction factors and wear factors achieved, for instance, by a material according to the invention containing 80% by wt of polyethylene, 10% by wt of PTFE and 10% by wt of chalk. The superiority of the combination of PTFE and chalk manifests itself here particularly in the wear factors.

The tests were also made on a pin-roll test bench as was explained in connection with FIG. 4.

Figure 6:
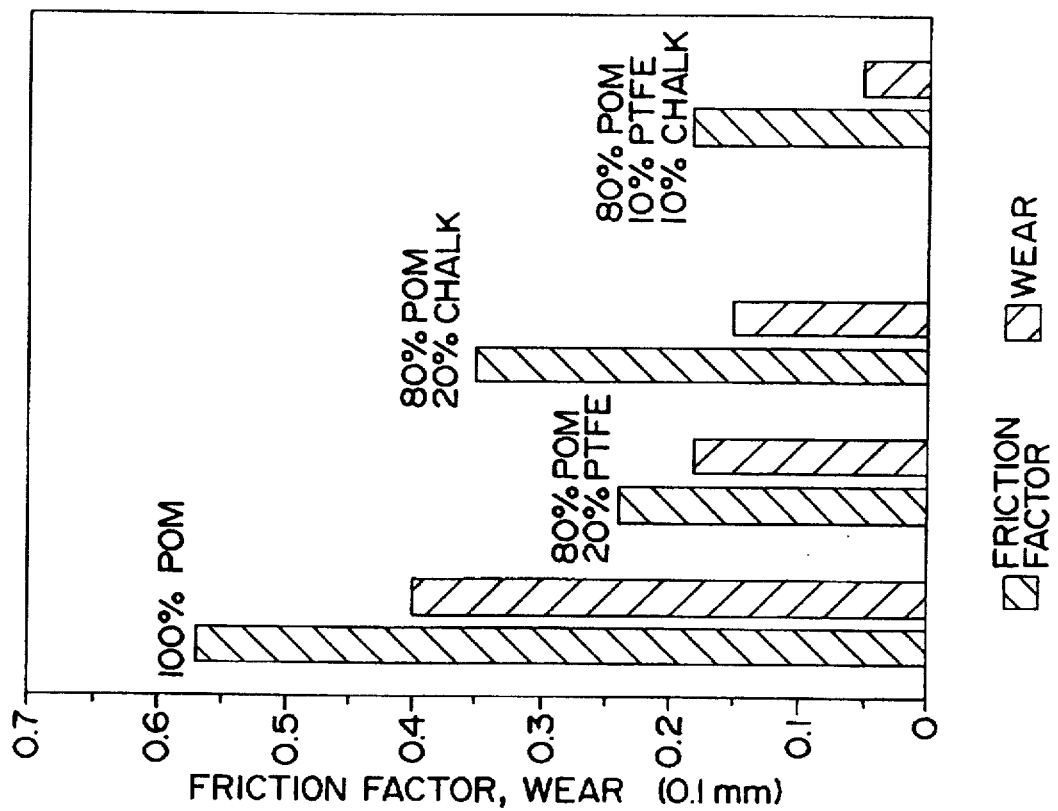
FIG. 6 is a friction factor/wear diagram for materials having a POM matrix.

In FIG. 6 is shown a further bar chart for materials having a POM matrix. The tests were also made on a pin-roll test bench with the parameters mentioned with reference to FIG. 4. Also here is shown the clear superiority of the combination of the additives PTFE and chalk in a POM matrix.

Figure 7:
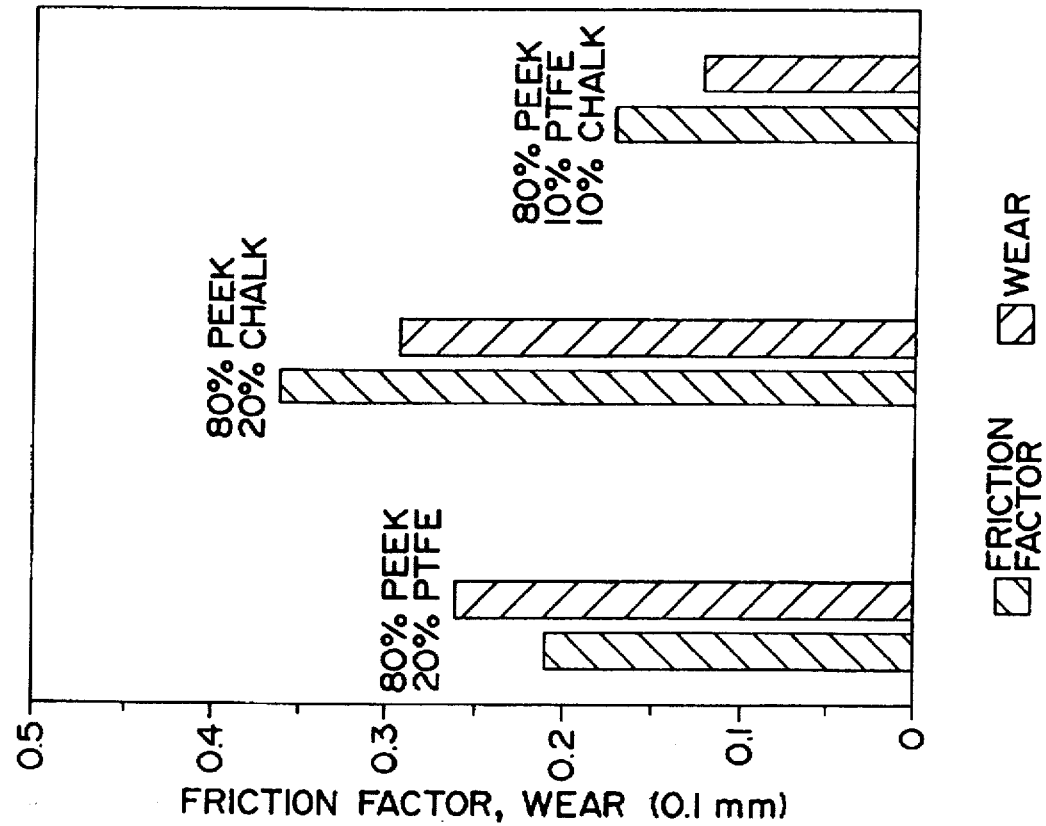
FIG. 7 is a friction factor/wear diagram for materials having a PEEK matrix.

In FIG. 7 is shown a further bar chart for materials having a PEEK matrix. The tests were also made on a pin-roll test bench with the parameters mentioned with reference to FIG. 4. Also in the case of a PEEK matrix are shown the significant advantages of the combination of 10% of PTFE and 10% of chalk as regards friction factors and wear rate compared to materials which have only chalk or only PTFE.

What is claimed is:

1. A plain bearing material, comprising a matrix consisting essentially of a single thermoplastic polymer; and antifriction material comprising about 10% to 60% by weight of polytetrafluoroethylene and about 5% to 20% by weight of chalk.

2. The plain bearing material according to claim 1, wherein the thermoplastic polymer forming the matrix is selected from the group consisting of polytetrafluoroethylene, polyethylene, polyamide, polyoxymethylene, poly(vinylidene difluoride), poly (butylene terephthalate), perfluoroalkoxy polymer, fluorinated ethylene polypropylene, poly(propylene adipate), liquid crystalline polymers, and poly(ether ketone).

3. The plain bearing material according to claim 1, wherein the polytetrafluoroethylene is in the form of powder having a particle size $\leq 10$ um and a specific surface area $\geq 5$ m$^2$ per gram.

4. The plain bearing material according to claim 1, wherein the chalk is in the form of a powder having a particle size $\leq 20$ um and a specific surface area $\leq 3$ m$^2$ per gram.

5. The plain bearing material according to claim 1 wherein the chalk is selected from the group consisting of calcite and aragonite.

6. The plain bearing material according to claim 1, wherein the polytetrafluoroethylene is contained in an amount of 15 to 50% by wt.

7. The plain bearing material according to claim 1 further comprising one or more additives selected from the group consisting of calcium fluoride, molybdenum disulfide, graphite, lead, lead oxide, bronze powder and fibers.

8. The plain bearing material according to claim 1 further comprising a metallic backing and wherein the plain bearing material is deposited directly on a mechanically roughened or chemically pretreated surface of the metallic backing.

9. The plain bearing material according to claim 8 wherein the plain bearing material is deposited on a base sintered or sprayed on the metallic backing.

10. The plain bearing material of claim 8, wherein the thickness of the plain bearing material is 50 μm to 1 mm.

11. The plain bearing material of claim 8, wherein the thickness of the plain bearing material is 80 to 300 μm.

12. A plain bearing material consisting essentially of a matrix comprising 50% to 95% by weight of polytetrafluoroethylene and antifriction material comprising 5% to 50% by weight of chalk.

* * * * *